(12) United States Patent
Funayama et al.

(10) Patent No.: US 9,870,786 B2
(45) Date of Patent: Jan. 16, 2018

(54) METHOD OF MANUFACTURING MAGNETIC RECORDING HEAD

(71) Applicant: Kabushiki Kaisha Toshiba, Minato-ku, Tokyo (JP)

(72) Inventors: Tomomi Funayama, Fuchu Tokyo (JP); Akihiko Takeo, Kokubunji Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 263 days.

(21) Appl. No.: 14/928,868

(22) Filed: Oct. 30, 2015

(65) Prior Publication Data

US 2017/0047084 A1 Feb. 16, 2017

(30) Foreign Application Priority Data

Aug. 12, 2015 (JP) ................. 2015-159397

(51) Int. Cl.
*G11B 5/11* (2006.01)
*G11B 5/31* (2006.01)
*G11B 5/00* (2006.01)

(52) U.S. Cl.
CPC .............. *G11B 5/112* (2013.01); *G11B 5/315* (2013.01); *G11B 5/3146* (2013.01); *G11B 5/3166* (2013.01); *G11B 5/3169* (2013.01); *G11B 5/3173* (2013.01); *G11B 2005/0024* (2013.01)

(58) Field of Classification Search
CPC ..... G11B 5/112; G11B 5/3146; G11B 5/3166; G11B 5/3169; G11B 5/3172; G11B 2005/0024
See application file for complete search history.

(56) References Cited

U.S. PATENT DOCUMENTS

| | | | | |
|---|---|---|---|---|
| 3,787,638 A * | 1/1974 | Murai | ................... | G11B 5/1871 29/603.1 |
| 3,821,815 A * | 6/1974 | Abbott | ................. | G11B 5/3133 29/603.09 |
| 4,155,106 A * | 5/1979 | Muraoka | .............. | G11B 5/1871 29/603.09 |
| 4,670,732 A * | 6/1987 | Church | ................. | B24B 37/013 257/E43.006 |
| 6,193,584 B1 * | 2/2001 | Rudy | .................... | B24B 37/013 29/593 |
| 6,364,743 B1 * | 4/2002 | Pust | ...................... | B24B 37/013 257/E21.53 |
| 7,961,439 B2 * | 6/2011 | Sato | ....................... | G11B 5/314 360/324 |
| 8,018,678 B1 * | 9/2011 | Zhang | .................. | G11B 5/1278 360/125.02 |

(Continued)

FOREIGN PATENT DOCUMENTS

JP 5651086 B2 1/2015

*Primary Examiner* — Carl Arbes
(74) *Attorney, Agent, or Firm* — White & Case LLP

(57) ABSTRACT

According to one embodiment, a method of manufacturing a magnetic recording head includes forming a microwave oscillator to cover a main pole and a side shield and also to cross at least a part of a side gap between the main pole and the side shield, and lapping the main pole, the side shield and the microwave oscillator in a height direction while monitoring an electric resistance between the main pole and the side shield.

18 Claims, 10 Drawing Sheets

(56) References Cited

U.S. PATENT DOCUMENTS

| | | | | |
|---|---|---|---|---|
| 8,165,709 B1* | 4/2012 | Rudy | ................... | G11B 5/3166 |
| | | | | 700/121 |
| 8,351,162 B2* | 1/2013 | Etoh | ................... | G11B 5/1278 |
| | | | | 360/121 |
| 8,443,510 B1* | 5/2013 | Shi | ....................... | G11B 5/1278 |
| | | | | 29/603.12 |
| 8,453,317 B2* | 6/2013 | Allen | ................... | G11B 5/3166 |
| | | | | 29/603.11 |
| 2009/0080120 A1* | 3/2009 | Funayama | ............... | G11B 5/02 |
| | | | | 360/319 |
| 2010/0027161 A1* | 2/2010 | Takagishi | ............... | G11B 5/314 |
| | | | | 360/110 |
| 2012/0113543 A1* | 5/2012 | Shiimoto | .............. | G11B 5/3116 |
| | | | | 360/75 |
| 2013/0321956 A1* | 12/2013 | Shiimoto | .............. | G11B 5/3116 |
| | | | | 360/236.5 |
| 2014/0063658 A1* | 3/2014 | Shimizu | ................... | G11B 5/35 |
| | | | | 360/234.5 |

* cited by examiner

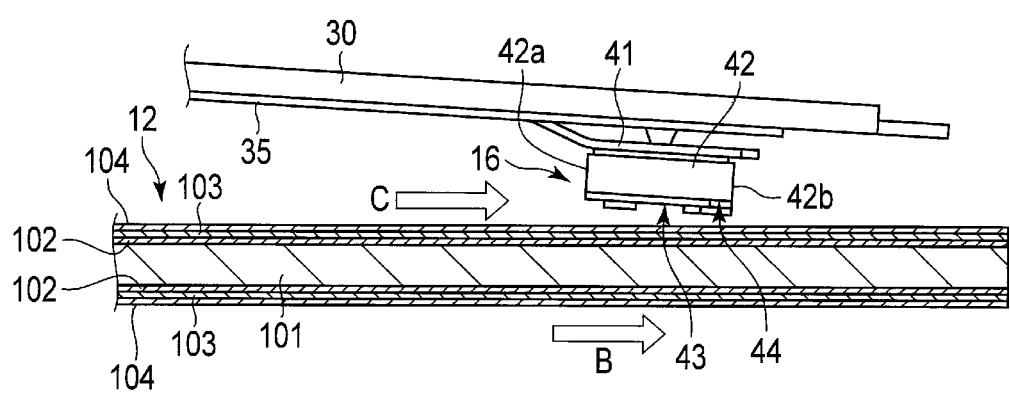
F I G. 1

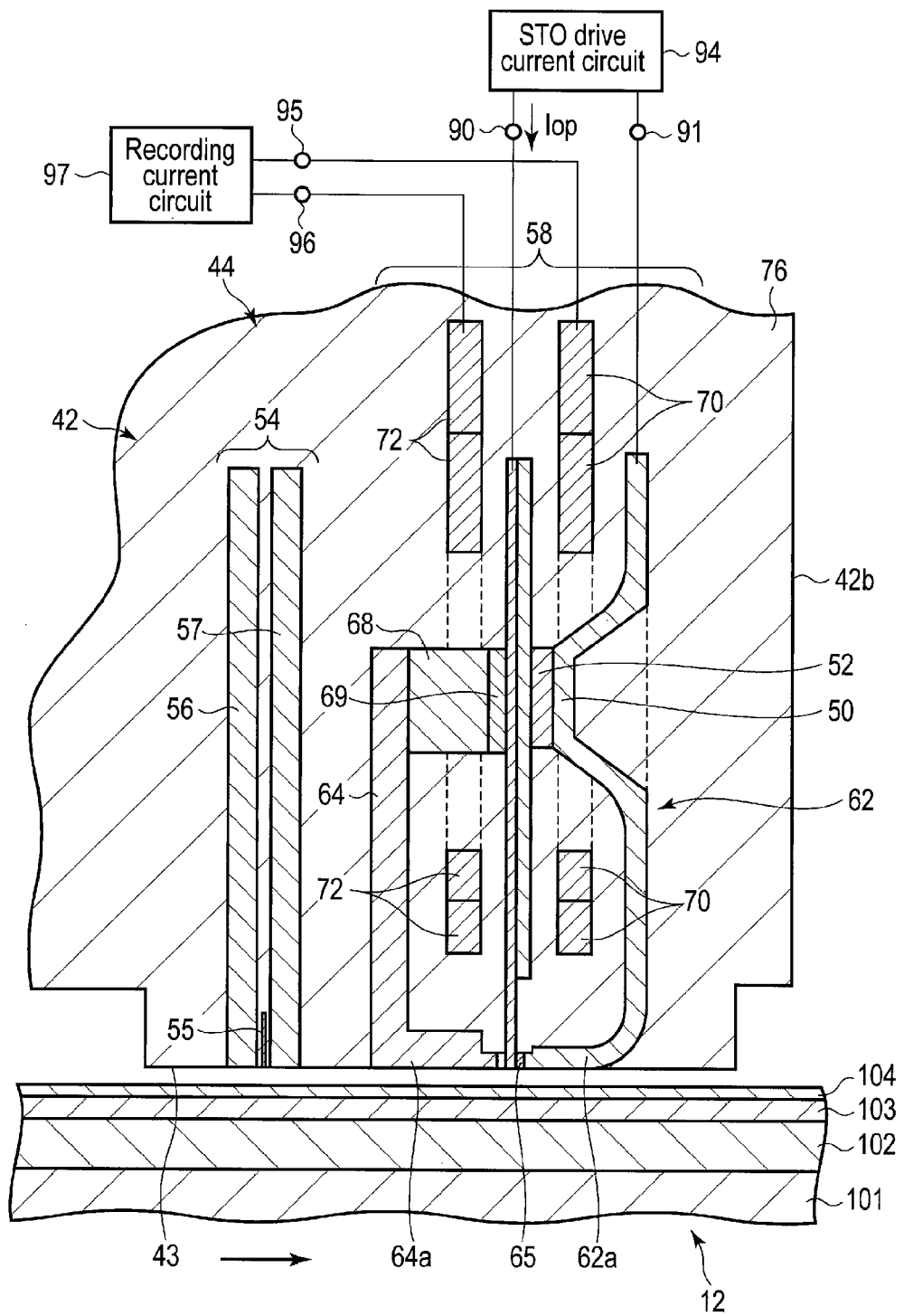
F I G. 2

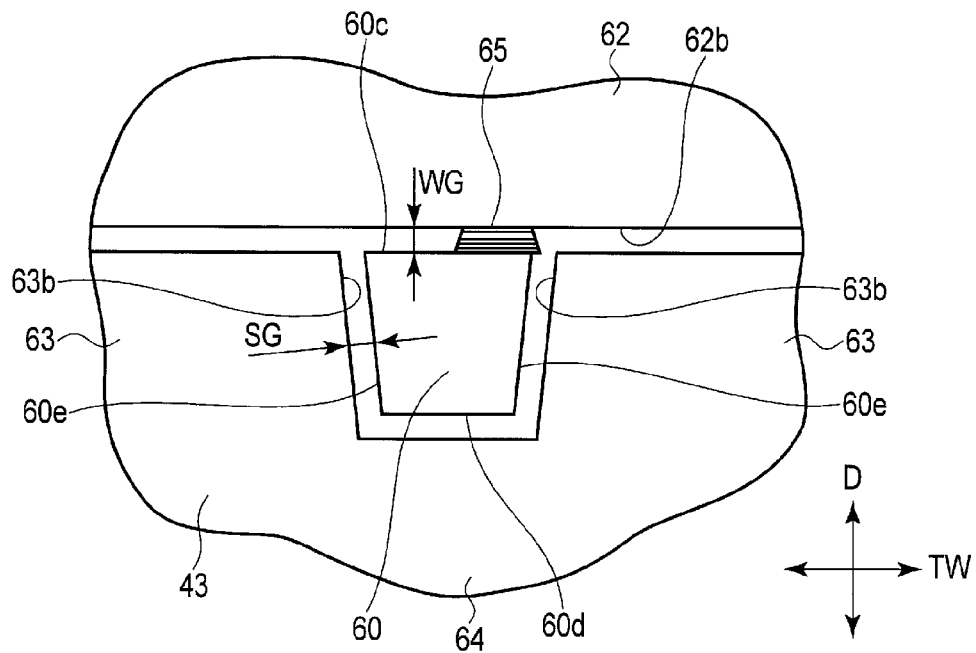
F I G. 4
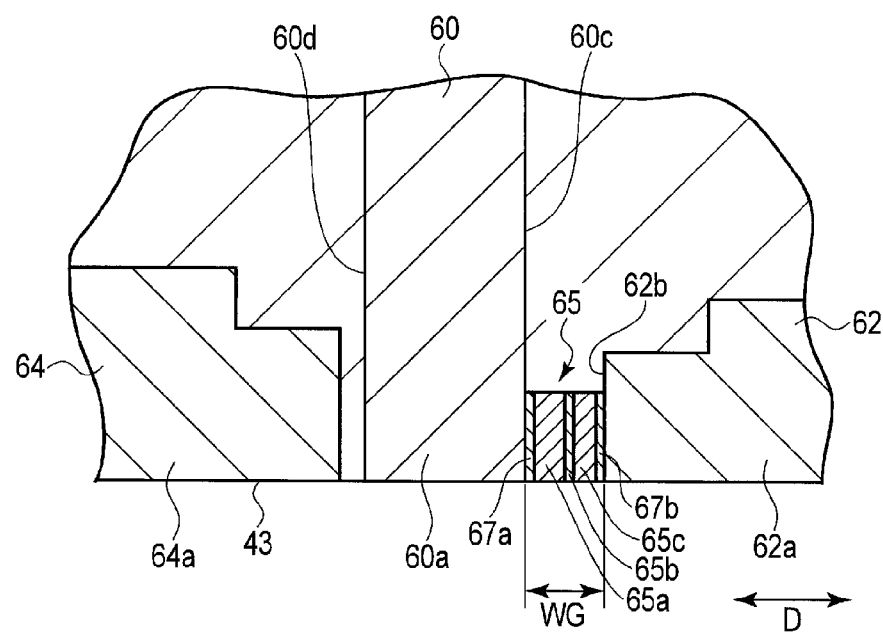
F I G. 5

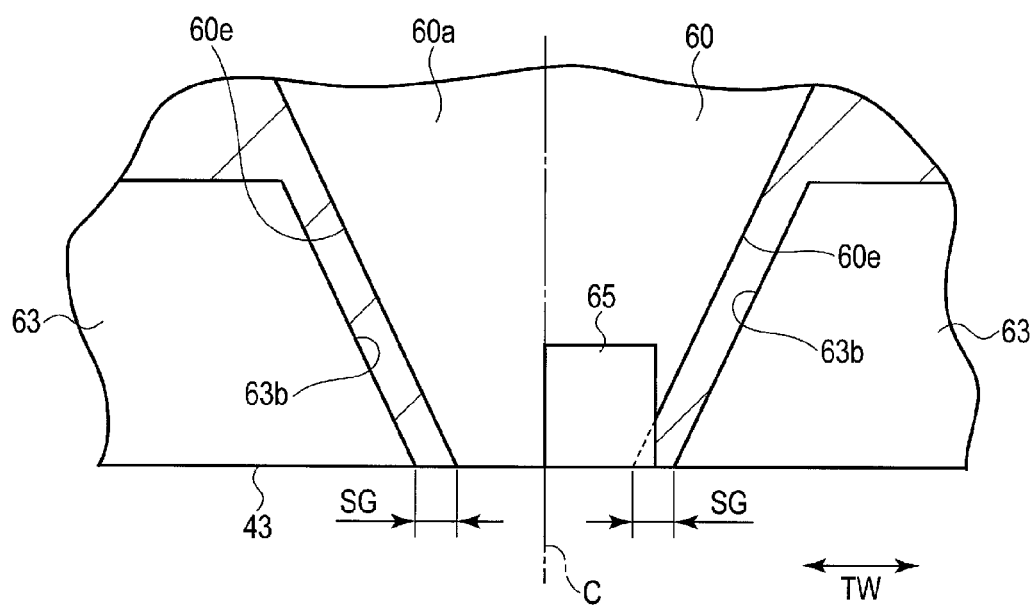
F I G. 6
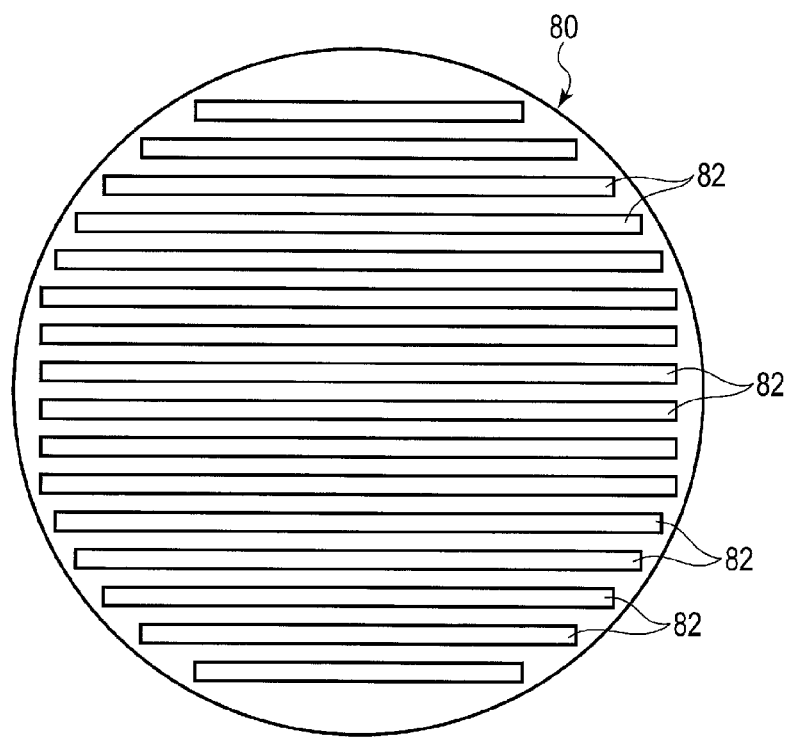
F I G. 7

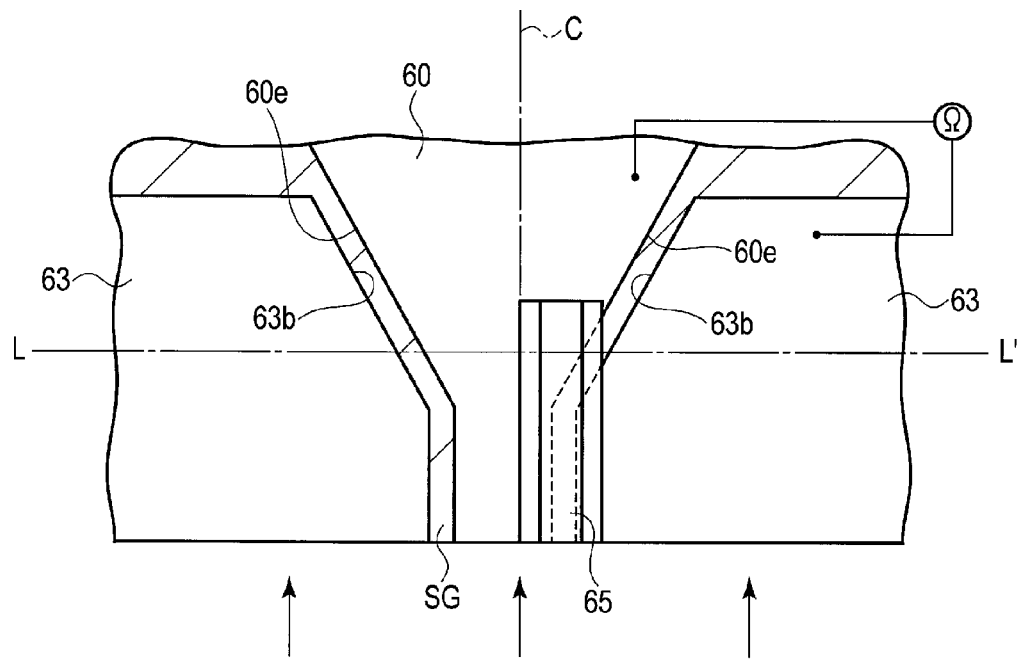
F I G. 9
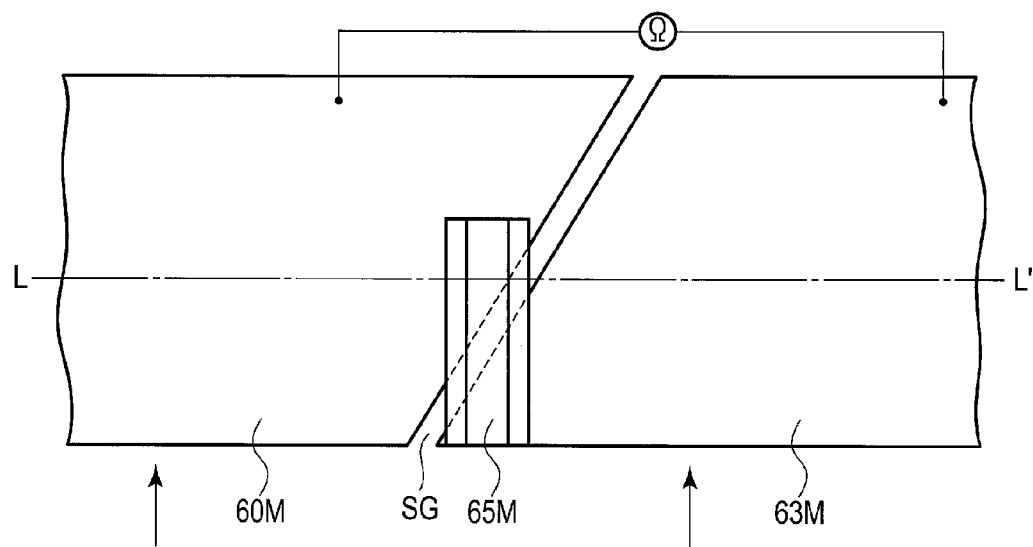
F I G. 10

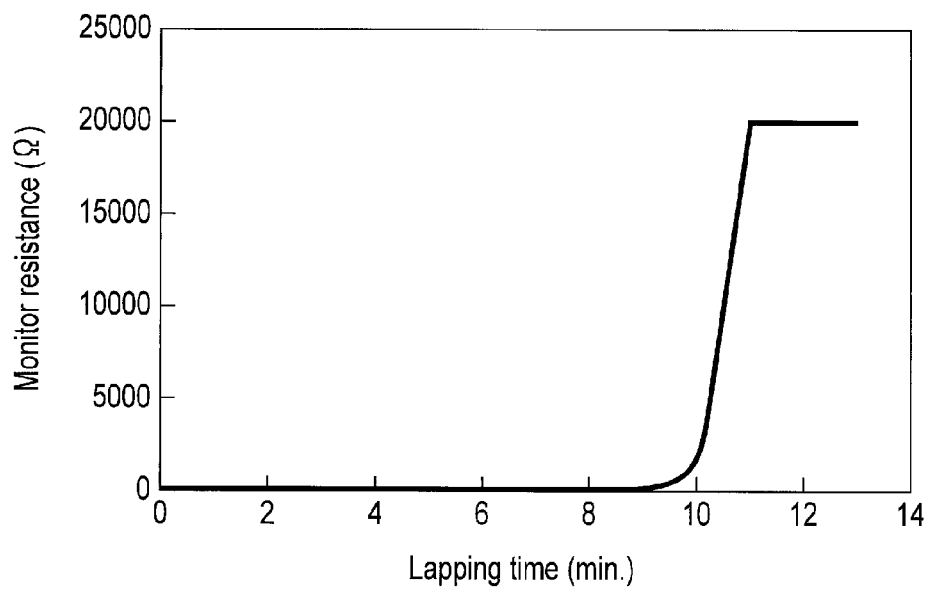
F I G. 11
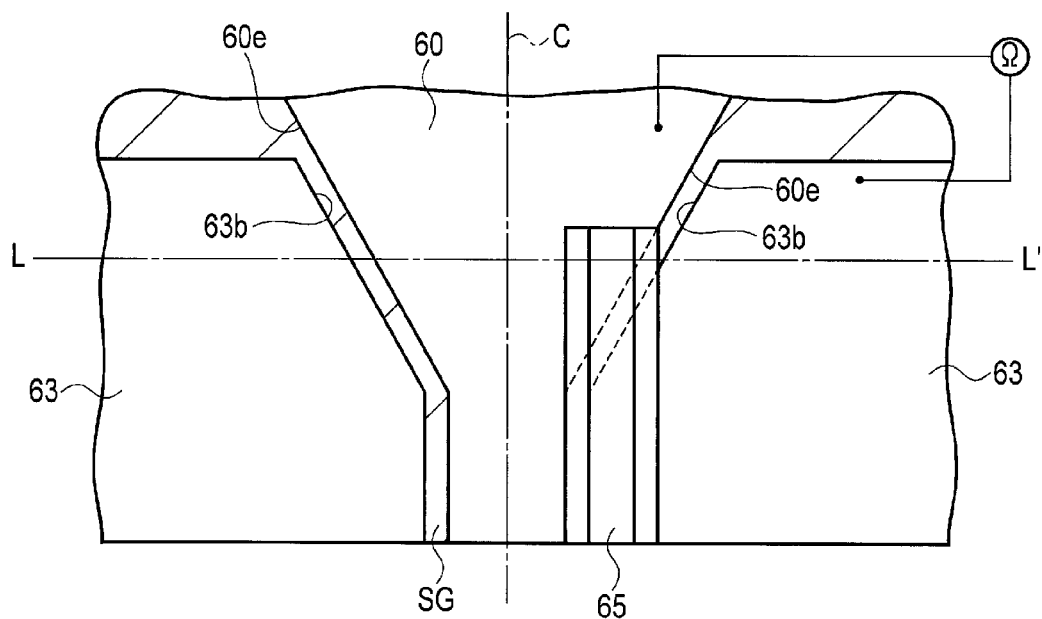
F I G. 12

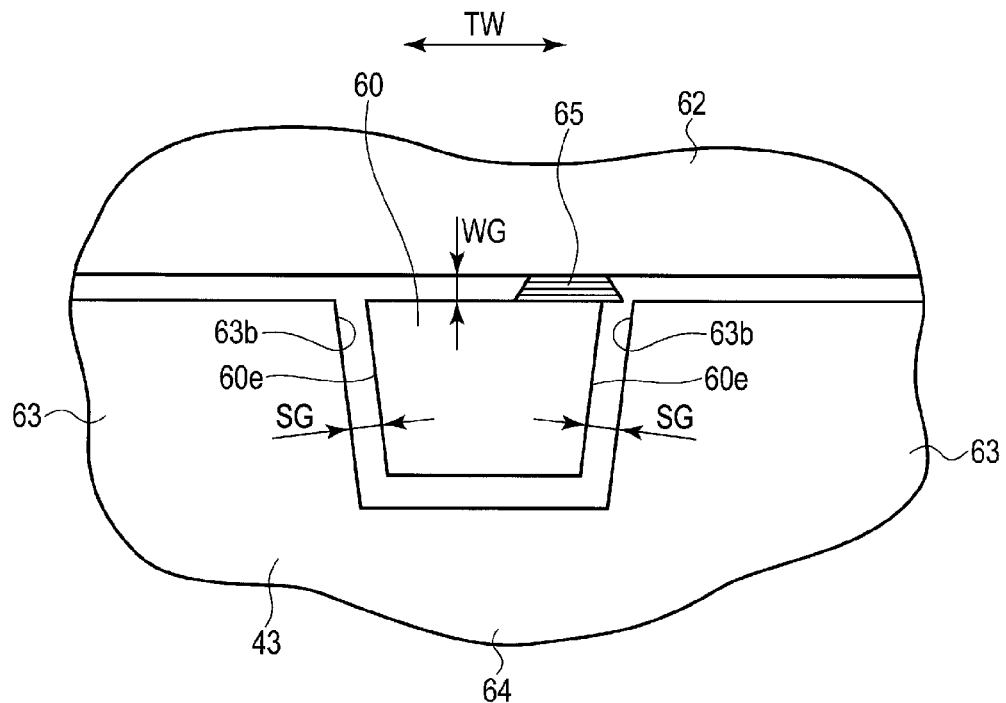
F I G. 13
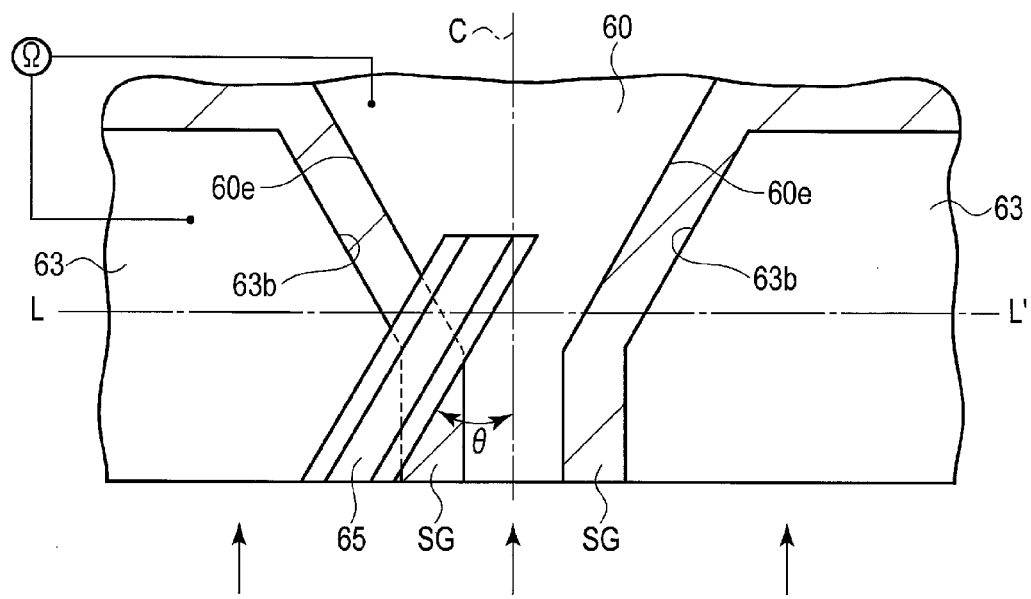
F I G. 14

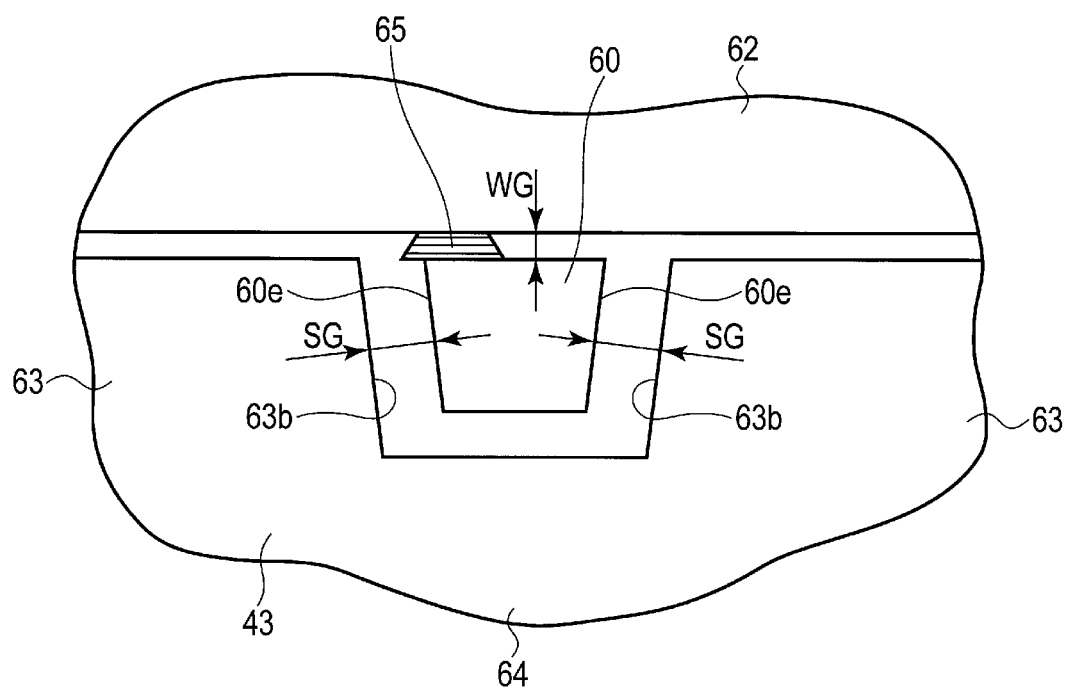
F I G. 15

METHOD OF MANUFACTURING MAGNETIC RECORDING HEAD

CROSS-REFERENCE TO RELATED APPLICATIONS

This application is based upon and claims the benefit of priority from Japanese Patent Application No. 2015-159397, filed Aug. 12, 2015, the entire contents of which are incorporated herein by reference.

FIELD

Embodiments described herein relate generally to a method of manufacturing a magnetic recording head comprising a microwave oscillator.

BACKGROUND

In recent years, magnetic heads for vertical magnetic recording have been proposed in order to achieve a higher recording density, a larger capacity or miniaturization of the magnetic disk device. In such a magnetic head, the recording head comprises a main pole configured to produce a perpendicular magnetic field, a write shield arranged to interpose a write gap on a trailing side of the main pole and configured to close a magnetic path between a magnetic disk and itself, and a coil configured to allow magnetic flux to flow to the main pole. Further, a microwave-assist magnetic recording head has been proposed, in which a microwave oscillator (high frequency oscillator) is arranged between the main pole and the write shield (write gap).

As a method of manufacturing such a magnetic recording head, a self-aligning method has been proposed. In this method, a microwave oscillator is formed so as to cover a stepped portion of a main pole, and the microwave oscillator is divided into two regions utilizing the stepped portion. Then, one of these sections of the microwave oscillator, which is not located on the main pole is partially scraped to align the ends of the main pole and the microwave oscillator with each other.

However, with the above-described method, a distorted microwave oscillator is formed in the stepped section of the main pole, and the distorted portion remains in the end on a main-pole side of the stepped section. The distorted portion of the microwave oscillator causes degradation of radiation characteristics and therefore it is difficult to obtain excellent radiation characteristics of the microwave oscillator.

BRIEF DESCRIPTION OF THE DRAWINGS

FIG. 1 is a side view showing an example of a magnetic head and a magnetic disk installed in a hard disk drive (HDD hereinafter).

FIG. 2 is an enlarged sectional view showing a head portion of the magnetic head.

FIG. 4 is an enlarged plan view showing an ABS-side end portion of the recording head as viewed from the ABS side.

FIG. 5 is an enlarged sectional view showing the ABS side end portion of the recording head, taken along the track center.

FIG. 6 is a schematic side view showing the main pole of the recording head, a side shield and STO, as viewed from the trailing side (wafer surface side) of the recording head.

FIG. 7 is a plan view briefly showing a head wafer in which a number of magnetic heads are formed, in the first embodiment.

FIG. 9 is a plan view briefly showing a part of the magnetic recording head as viewed from the wafer surface side during a process of the manufacturing method according to the first embodiment.

FIG. 10 is a plan view showing briefly a main pole pattern, a side shield pattern and an STO pattern for the monitor corresponding to the magnetic recording head.

FIG. 11 is a diagram showing the relationship between a lapping time and a monitor resistance.

FIG. 12 is a plan view briefly showing a magnetic recording head in the state where the STO is formed to be displaced towards the end of the main pole in the width direction as viewed from the wafer surface side in first embodiment.

FIG. 13 is a plan view of a magnetic recording head formed by lapping the magnetic recording head shown in FIG. 12, as viewed from the ABS side.

FIG. 14 is a plan view briefly showing a part of the magnetic recording head during a process of a manufacturing method according to the second embodiment as views from the wafer surface side.

FIG. 15 a plan view of a magnetic recording head formed by lapping the magnetic recording head shown in FIG. 14, as viewed from the ABS side.

DETAILED DESCRIPTION

Figure 3:
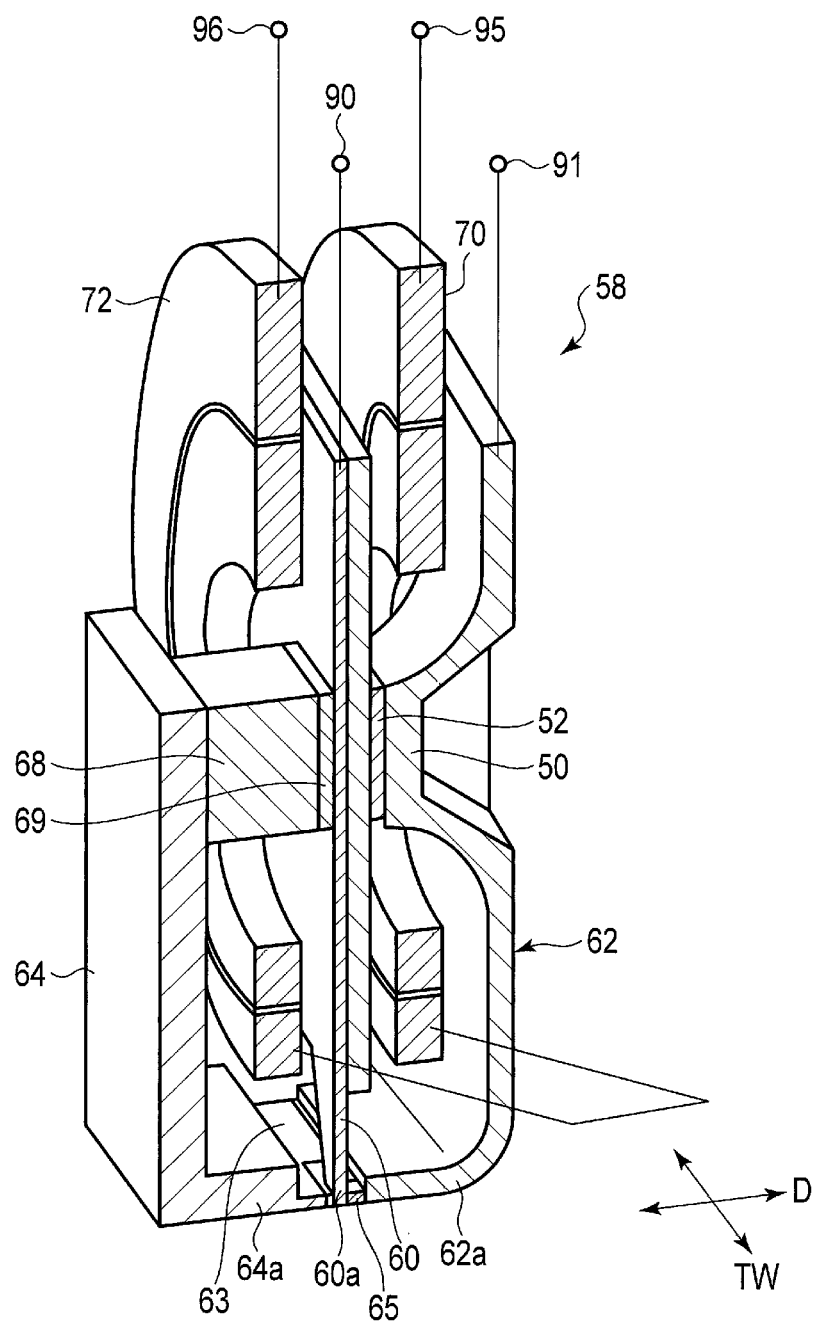
FIG. 3 is a perspective diagram showing the recording head of the head portion cut away along a tracking center.

Various embodiments will be described hereinafter with reference to the accompanying drawings. In general, according to one embodiment, there is provided is a method of manufacturing a magnetic recording head which comprises a main pole configured to apply a recording magnetic field, a write shield opposing the main pole with a write gap between the main pole and the write shield, a side shield disposed on a lateral side of the main pole in a width direction thereof with a side gap between the main pole and the side shield, and a microwave oscillator provided between the main pole and the write shield within the write gap; the method comprises: forming the microwave oscillator to cover the main pole and the side shield and also to cross at least a part of the side gap; and lapping the main pole, the side shield and the microwave oscillator in a height direction while monitoring an electric resistance between the main pole and the side shield.

First Embodiment

First, the structure of a magnetic recording head to which the manufacturing method of this embodiment is applied will be described. FIG. 1 is a side view briefly showing a magnetic head and a magnetic disk of a hard disk drive (magnetic recording device).

As shown in FIG. 1, a magnetic head 16 is constructed as a flying type head and comprises a slider 42 formed into substantially a rectangular parallelepiped shape and a recording/reading head section 44 formed in an end of the slider, on a sliding-out end (trailing) side. The slider 42 is formed of a sintered body of, for example, alumina and titanium carbide (AlTiC) and the head section 44 is formed by stacking thin films. The magnetic head 16 is fixed to a gimbal spring 41 provided in a distal end of a suspension 30.

The magnetic head 16 is electrically connected to interconnecting wire member 35 fixed on the suspension 30.

On the other hand, a magnetic disk 12 comprises a substrate 101 formed into a disk shape and of a nonmagnetic body. On each surface of the substrate 101, a soft magnetism layer 102 of a material exhibiting soft magnetic properties, as an underlying layer, a magnetic recording layer 103 having a magnetic anisotropy perpendicularly to a disk surface, as an upper layer, and a protective film layer 104 as a further upper layer are stacked in this order.

The slider 42 comprises a rectangular disk-facing surface (air bearing surface [ABS]) 43 facing a surface of the magnetic disk 12. The slider 42 is flied by air flow C produced between the disk surface and the ABS 43 by rotation of the magnetic disk 12. The direction of the air flow C coincides with the direction of a rotating direction B of the magnetic disk 12.

The slider 42 comprises a leading end 42a located on an inflow side of the air flow C and a trailing end 42b located on an outflow side of the air flow C. On the ABS 43 of the slider 42, a leading step, a trailing step, a side step, a negative pressure cavity, etc., (not shown) are formed.

FIG. 2 is an enlarged sectional view showing the head 44 and the magnetic disk 12 of the magnetic head 16. The head section 44 comprises a read head 54 and a recording head (magnetic recording head) 58, formed on the slider 42 by the thin film process and is formed as a separate-type magnetic head. The read head 54 and the recording head 58 are covered by a protective insulating film 76 except for the portion exposed to the ABS 43 of the slider 42. The protective insulating film 76 constitutes an outer shape of the head 44.

The read head 54 comprises a magnetic film 55 exhibiting a magneto-resistive effect and shield films 56 and 57 arranged so as to interpose the magnetic film 55 on respectively a trailing side and a reading side of the magnetic film. Lower ends of the magnetism film 55 and the shield films 56 and 57 are exposed to the ABS 43 of the slider 42.

The recording head 58 is provided on the trailing end 42b side of the slider 42 with respect to the read head 54. FIG. 3 is cutaway perspective view schematically showing the recording head 58 along the track center on the magnetic disk 12. FIG. 4 is a plan view of a distal end of the recording head on a recording medium side as viewed from the ABS side. FIG. 5 is an enlarged sectional view of an ABS-side end of the recording head, taken along the track center. FIG. 6 is a schematic view of the main pole, the side shield and the STO of the recording head, as viewed from the trailing side of the recording head.

As shown in FIG. 2 to FIG. 4, the recording head 58 comprises a main pole 60 formed of a high saturation-magnetic-flux-density material generating a perpendicular recording magnetic field with respect to the surface of the magnetic disk 12, a trailing shield (write shield) 62 arranged on the trailing side of the main pole 60 with a write gap WG (a gap length in the down-track direction D) between them and formed of a soft magnetic material provided to efficiently close the magnetic path via the soft magnetism layer 102 directly under the main pole 60, a pair of side shields 63 disposed respectively on both sides of the main pole 60 in the track width direction TW, so as to face each other via a side gap SG on each side, a leading shield 64 located on the leading side of the main pole 60 with a gap, and a microwave oscillator (high frequency oscillator), for example, a spin torque oscillator (STO) 65 arranged between an ABS 43-side distal end 60a of the main pole 60 and the trailing shield 62 in a section facing the ABS 43. In this embodiment, the side shields 63 and the leading shield 64 may be formed of a soft magnetic material as an integral unit.

The trailing shield 62 is formed into substantially an L-shape and comprises a first connecting portion 50 connected to the main pole 60. The first connecting 50 is connected to an upper portion of the main pole 60, more specifically, the upper portion (back gap) spaced from the ABS 43, via a non-conductive material 52. The leading shield 64 comprises a first connecting portion 68 joined to the main pole 60 via a non-conductive material (insulator) 69 at a position (back gap) spaced from ABS 43.

This first connector 68 is formed of, for example, a soft magnetic material and constitutes a magnetic circuit together with the main pole 60 and the leading shield 64. Further, at the position of the first connector 68, the main pole 60 and the leading shield 64 are electrically insulated by an insulator 69.

The recording head 58 comprises a first recording coil 70 and a second recording coil 72, which allow magnetic flux to flow to the main pole 60. The first recording coil 70 is wound around a first magnetic core including the main pole 60 and the trailing shield 62, and the second recording coil 72 is wound around a second magnetic core including the main pole 60 and the leading shield 64. To the first recording coil 70 and the second recording coil 72, connected are terminals 95 and 96, respectively, and the terminals 95 and 96 are connected to a recording current circuit 97. The second recording coil 72 is connected in series to the first recording coil 70. When writing a signal in the magnetic disk 12, a predetermined current is supplied to the first recording coil 70 and the second recording coil 72 from the recording current circuit 97 to allow magnetic flux to flow to the main pole 60, thereby producing a magnetic field.

As shown in FIGS. 3 to 6, the main pole 60 extends substantially perpendicular to the surface of the magnetic disk 12 and the ABS 43. The distal end portion 60a of the main pole 60, on the ABS 43 side is narrowed down toward the ABS 43 (into a funnel shape). The distal end portion 60a of the main pole 60 comprises a trailing side edge face 60c located in the trailing end side, a reading side edge face 60d opposing the trailing side edge faces and both-side faces 60e. The distal end surface of the main pole 60 is exposed to the ABS 43 of the slider 42. The both-side face 60e is inclined with respect to a central axis C of the main pole 60, that is, to the direction perpendicular to the ABS 43.

A distal end portion 62a of the trailing shield 62 is formed into a slender rectangular shape. The lower end face of the trailing shield 62 is exposed to the ABS 43 of the slider 42. A leading side edge face (main pole side edge face) 62b of the distal end portion 62a is extended substantially perpendicularly to the ABS 43 and also in the track width direction TW. In the distal end 60a of the main pole 60, the leading side edge face 62b faces the trailing side edge face 60c of the main pole 60 to be parallel to each other with the write gap WG therebetween.

In this embodiment, the pair of side shields 63 are formed of a soft magnetic material integrally with the leading shield 64 as one unit and are extended out from the leading shield 64 towards the trailing shield 62. The pair of side shields 63 are physically divided from the main pole 60 on both sides thereof in a track width direction, and are magnetically and electrically connected with the leading shield 64. A side face 63b of each side shield 63 faces substantially parallel to a respective side face 60e of the main pole 60 with a gap SG therebetween. Distal end faces of the side shields 63 are exposed to the ABS 43. The gap SG between each side face 60e of the main pole 60 and each respective side shield 63 is set to be substantially equal to the gap length of the write gap WG.

A protective insulating film 76 formed of an insulator, for example, alumina, silicon oxide, or the like, is formed in a space between the main pole 60 and the distal end 62a of the trailing shield 62, that between the main pole 60 and the leading shield 64 and that between the main pole 60 and each side shield 63.

As shown in FIGS. 4 to 6, in the write gap WG, the STO 65 is provided between the distal end portion 60a of the main pole 60 and the trailing shield 62, and a part thereof is exposed to the ABS 43. The STO 65 comprises a spin injection layer (SIL) 65a, an intermediate layer (nonmagnetic conductive layer) 65b and an oscillation layer (frequency generating layer) (FGL) 65c, which are stacked in the order from the main pole 60 side towards the trailing shield 62 side in the down-track direction D. The spin injection layer 65a is connected to the trailing side edge face 60c of the main pole 60 via the nonmagnetic conductive layer (underlying layer) 67a. The oscillation layer 65c is connected to the leading side edge face 62b of the trailing shield 62 via the nonmagnetic conductive layer (cap layer) 67b. Note that the order of stacking of the spin injection layer 65a, the intermediate layer 65b and the oscillation layer 65c may be reversed, that is, these layers may be stacked from the trailing shield 62 side towards the main pole 60 side.

The spin injection layer 65a, the intermediate layer 65b and the oscillation layer 65c each comprise a stacking surface or a film surface extending in the direction which crosses the ABS 43, for example, in the perpendicularly crossing direction. A lower end surface of the STO 65 is exposed to the ABS 43 and is formed to be flush with the ABS 43. A width of the STO 65 is smaller than that of the main pole 60 in the track width direction TW. In this embodiment, the STO 65 is arranged to be shifted to one end side in the track width direction of the main pole 60 with respect to the central axis C of the main pole 60.

As shown in FIGS. 2 and 3, terminals 90 and 91 are connected to the main pole 60 and the trailing shield 62, and the terminals 90 and 91 are connected to an STO drive current circuit 94. A drive current Iop of the STO can be allowed to flow in series from the STO drive current circuit 94 through the main pole 60, the STO 65 and the trailing shield 62.

Figure 8:
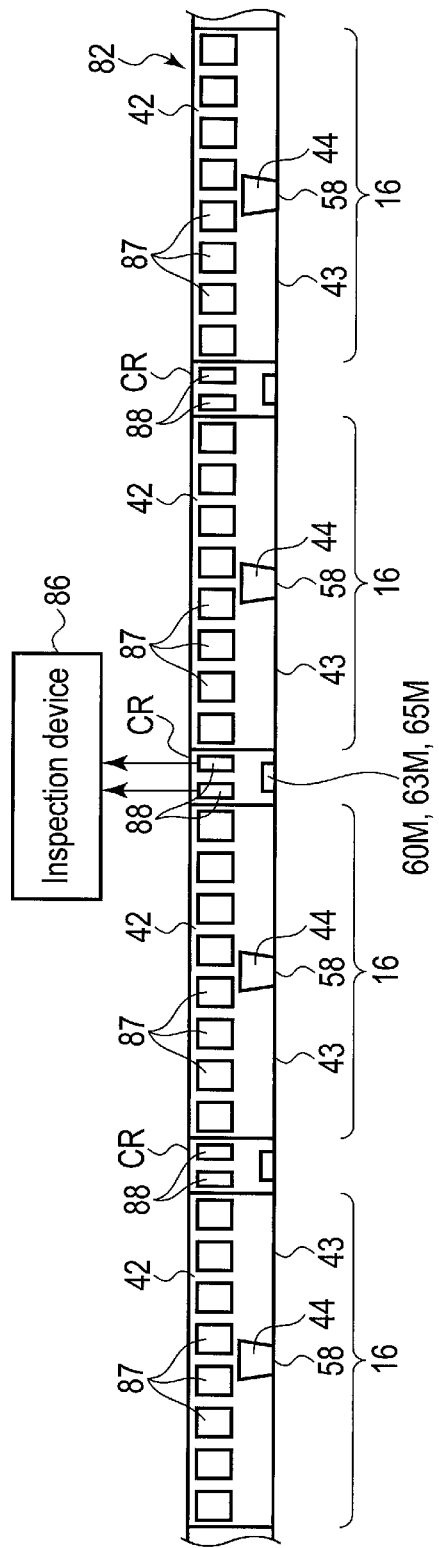
FIG. 8 is an enlarged plan view showing a rod piece cut from the head wafer.

Next, an example of the method of manufacturing a magnetic head constituted as above, especially, a magnetic recording head will now be described. FIG. 7 is a plan view showing a head wafer in which a number of magnetic heads are formed by stacking thin films. FIG. 8 is an expanded plan view showing a rod piece cut out from the head wafer.

As shown in FIG. 7, in the process of manufacturing a magnetic head, a large number of magnetic heads 16 each including a slider, a read head, a recording head, a recording coil and an STO are successively formed in a plurality of lines 82 on a head wafer 80 by a thin film stacking process. Each magnetic head is constituted as the magnetic head 16 described above. Subsequently, as shown in FIG. 8, the magnetic heads of each line 82 are cut out from the head wafer 80 and separated into a plurality of rod pieces 84 each including a plurality of magnetic heads 16 formed successively.

In the manufacture of each magnetic head 16, the main pole 60 and the side shields 63 are formed, and the STO 65 is formed so as to cover the main pole 60 and also cross at least a part of a side gap SG. In other words, the STO 65 is formed to electrically connect the main pole 60 and a side shield 63 to each other. In this embodiment, the STO 65 is formed so as to extend substantially parallel to the central axis C of the main pole 60 in the height direction, and further formed in a position displaced to one end side of the main pole 60 in the width direction. Thus, the STO 65 extends to cross the gap SG between an inclined side surface 60e of the main pole 60 and the side surface 63b of the side shield 63. The STO 65 is patterned by ion milling and its section has substantially a trapezoidal shape. The STO 65 is formed so as to be connected to the side shield 63 in a lower side of the trapezoid in a region below line L-L'. Thus, the STO 65 electrically connects the main pole 60 and the side shields 63 to each other in the below the line L-L'.

Meanwhile, as shown in FIG. 8, a plurality of electrode pads 87 electrically conducting to a read head, a recording head and an STO, respectively, are formed on the trailing side edge face of each magnetic head 16.

Subsequently, as shown in FIGS. 8 and 9, the ABS 43 of each magnetic head 16 is lapped (polished) to have a predetermined height while monitoring the electric resistance between the main pole 60 and one of the side shields 63 with an inspection device 86. It is possible to monitor the magnetic head 16 directly, but in this embodiment, the electric resistance is monitored using a monitoring pattern formed in a cut region CR of the rod piece 84 to further facilitate monitoring. That is, as shown in FIGS. 8 and 10, in similar and simultaneous manufacturing steps for the main pole 60 of the magnetic head 16, the side shields 63 and the STO 65, a main pole pattern 60M, a side shield pattern 63M and a STO pattern 65M for the monitoring, are formed in advance in the cut region CR to correspond thereto, respectively. The main pole pattern 60M and the side shield pattern 63M have substantially the same forms and structures as those of the main pole 60 and the side shield 63, and they are placed to face each other via an inclined side gap SG. The STO pattern 65M is formed to bridge over the main pole pattern 60M and the side shield pattern 63M and to cross the inclined side gap SG. Further, a pair of inspection-use electrode pads 88 electrically conducting to the main pole pattern 60M and the side shield pattern 63M, respectively, are formed on the cut region CR.

The monitoring patterns and the inspection-use electrode pads 88 may be formed, for example, every five magnetic heads 16 on the cut region CR. A probe (inspection electrode) of the inspection device 86 is brought into contact with the main pole pattern 60M and the side shield pattern 63M via the inspection-use electrode pads 88, and thus the electric resistance therebetween is measured. Note that in the manufacturing process, it is desirable not to stack films other than a protective film on the monitoring patterns.

As shown in FIGS. 9 and 10, the magnetic head 16 and the monitoring pattern are subjected to height lapping in the height direction while monitoring the electric resistance between the main pole 60 and the side shield 63, and thus they are processed substantially to a position indicated by line L-L'. Then, when the electric resistance monitored exceeds a predetermined value, the lapping is stopped.

FIG. 11 shows the relationship between a lapping time (the amount of lapping) and the electric resistance value measured with an inspection device (monitor). As can be seen from this figure, the measured electric resistance exhibits a low value since the main pole pattern 60M and the side shield pattern 63M are connected via the STO pattern 65M in the state before starting height lapping. If the lapping is started from this state, the contact area of the STO pattern 65M and the side shield pattern 63M becomes small gradually and the electric resistance increases. When the lapping is further advanced to near a section defined by line L-L', that is, when the lapping side of the STO pattern 65M reaches the position of the side gap SG, the contact area of the STO pattern 65M and the side shield pattern 63M becomes very narrow, and therefore the electric resistance monitored begins to increase rapidly.

Then, the lapping is advanced over the L-L' section, the connection between the STO pattern 65M and the side shield pattern 63M is cut. Therefore, the electric resistance in this state becomes substantially infinite. However, since the main pole and the side shield are each connected to the ground of the magnetic head slider via a resistance of, for example, 10 kΩ, although not shown, the measured electric resistance between the main pole pattern 60M and the side shield pattern 63M is about 20 kΩ at this stage. Thus, when the electric resistance currently monitored reaches a predetermined value, here, about 20 kΩ, the height lapping is stopped.

The shape of the magnetic recording head at the time when the lapping is finished after a lapping time of 11 minutes actually illustrated in FIG. 11, is as shown in FIG. 4 and FIG. 6. It can be understood that the end of the STO 65 and the end of the main pole 60 are formed to be aligned. As described above, after lapping the head parts of the magnetic heads 16, the ABS 43 is processed on each magnetic head. Then, the rod piece 84 is cut at in the portion of the cut region RC, and the magnetic heads 16 are cut out. Thus, each magnetic head 16 is obtained.

FIG. 12 is a plan view of the case where the STO is displaced to the end side of the main pole in the track width direction as compared to the case of FIG. 9 in the alignment of the STO with respect to the main pole, as viewed from the wafer surface side. In this case also, lapping is carried out while monitoring the electric resistance between the electrodes drawn out from the main pole 60 and the side shield 63, respectively. As in the case of FIG. 9, the lapping is finished when the electric resistance currently monitored increases abruptly to a terminal point, which is about 20 kΩ.

FIG. 13 is a plan view of the magnetic recording head thus lapped as viewed from the ABS 43. In this case also, it can be understood that the magnetic recording head can be formed in the form where the end of the STO 65 and the end of the main pole 60 are aligned. But, the width of the main pole 60 in the track width direction TW is greater by the portion of the STO 65 being displaced. However, with a displacement which may result by an ordinary photolithography, the width of the main pole 60 is not displaced so much in terms of alignment accuracy. Therefore, in particular, for a recording head to be used for shingled magnetic recording, such displacement will not substantially create a problem.

In the manufacturing process, if the STO 65 displaces greatly, the formation of the STO 65 should be redone in the resist state before etching, and thus it is also possible to suppress the degree of displacement once again within a tolerance.

As described above, according to the method of manufacturing a magnetic head in this embodiment, the ends of the main pole and the STO can be formed to be aligned with each other without significantly degrading the oscillation characteristics of the STO. Further, the lapping is carried out while monitoring the electric resistance, and thus the terminal point of lapping, for specifying the height direction of the microwave oscillator can be detected accurately. In this manner, it is possible to manufacture a microwave-assist magnetic recording head with stable characteristics, in which the ends of the main pole and microwave oscillator are aligned with each other. Furthermore, since the STO and the main pole can be formed such that the ends thereof are aligned with each other, it is possible to obtain a magnetic recording head suitable not only for ordinary microwave-assist recording naturally, but also for microwave-assist recording by shingled magnetic recording (SMR).

Next, the method of manufacturing a magnetic head according to another embodiment will now be described. Note that in the description of the following embodiment, the same structural parts as those of the first embodiment described above are designated by the same referential symbols, and the detailed explanations therefor are omitted. Only structural parts different from those of the first embodiment will be described in detail.

Second Embodiment

FIG. 14 is a schematic diagram of a microwave-assist magnetic recording head in a step of the manufacturing method according to the second embodiment, as viewed from the wafer surface. FIG. 15 is a plan view of the magnetic recording head after lapping as viewed from the ABS side.

As shown in FIG. 14, an STO 65 is formed in the manufacturing process so as to cover a main pole 60 and one of side shields 63 and also to cross at least a part of a side gap SG. In other words, the STO 65 is formed so as to electrically connect the main pole 60 and the side shield 63 by the STO 65. In the second embodiment, the STO 65 is formed so as to incline with respect to the central axis C of the main pole 60, for example, by only an angle θ (about 30 degrees) in the height direction and further in a position displaced from the central axis C to one end side of the main pole 60 in a track width direction. With this structure, the STO 65 is extended to overlap the gap SG between an inclined side surface 60e of the main pole 60 and a side surface 63b of the side shield 63. The STO 65 is patterned by ion milling and its section has substantially a trapezoidal shape. The STO 65 is formed in a lower region below the finish portion of lapping (line L-L') so as to electrically connect the main pole 60 and the side shield 63 to each other. Further, in the second embodiment, the side gap SG is set wider than that of the first embodiment.

Subsequently, while monitoring the electric resistance between the main pole 60 and the side shield 63 with an inspection device, the ABS 43 of the magnetic head is subjected to height lapping in the height direction to be processed substantially to the position of a line L-L'. Then, the lapping is finished several tens of seconds after the time when the electric resistance currently monitored increases abruptly to a specified value, for example, 20 kΩ. With this lapping, a magnetic head shown in FIG. 15 is obtained. It is understood here that an end of the STO 65 and an end of the main pole 60 are formed to be aligned with each other. The high-frequency field is not spread so much and a sufficient microwave magnetic field intensity is obtained.

As described above, in the case where the side gap SG between the main pole 60 and the side shield 63 is wide, the STO 65 need to be formed parallel to the height direction (direction parallel to the central axis C) of the main pole 60. Here, in order to form the STO 65 to bridge over to the main pole 60 and the side shield 63, an extremely high alignment accuracy is required unless the width of the element the STO 65 is not wide. That is, there is an increased risk that the STO is not connected to one of the main pole and the side shields. Here, as in the second embodiment described above, if the STO 65 is formed to be inclined only by an angle θ from the height direction of the main pole 60, it is easy to form the STO 65 to bridge over the main pole 60 and the side shield 63. The of the STO 65 to the height direction of the main pole 60 should only be changed depending on how wide the STO 65 is as compared to the width of the side gap SG. That is, as the width of the STO 65 is greater, the angle θ of inclination can be set smaller. If the angle θ of inclination is excessively large, the distribution of the microwave magnetic field to be generated is degraded. To avoid this, it is desirable to set the angle θ of inclination in a range of about 5 to 45 degrees.

As mentioned above, according to the method of manufacturing a magnetic head, according to the second embodiment, the main pole and the end of STO can be formed so as to align the end thereof with each other without significantly degrading the oscillation characteristics of the STO. Further, the terminal point of lapping for specifying the height direction of the microwave oscillator can be detected with high accuracy by lapping while monitoring the electric resistance. Thus, it is possible to form a microwave-assist recording head of stable characteristics, in which the ends of the main pole and the microwave oscillator are aligned with each other. Moreover, a magnetic recording head suitable not only for ordinary microwave-assist recording, but also for microwave-assist recording by shingled magnetic recording can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

This manufacturing method can be applied to any magnetic recording head which comprises a main pole, a write shield, a side shield and a microwave oscillator, and is even applicable to a magnetic recording head without a leading shield. Note also that the materials, shapes, sizes and the like of the constituents of the head part can be changed if needed.

What is claimed is:

1. A method of manufacturing a magnetic recording head which comprises a main pole configured to apply a recording magnetic field, a write shield opposing the main pole with a write gap between the main pole and the write shield, a side shield disposed on a lateral side of the main pole in a width direction thereof with a side gap between the main pole and the side shield, and a microwave oscillator provided between the main pole and the write shield within the write gap, the method comprising:
    forming the microwave oscillator to cover the main pole and the side shield and also to cross at least a part of the side gap; and
    lapping the main pole, the side shield and the microwave oscillator in a height direction while monitoring an electric resistance between the main pole and the side shield.

2. The method of claim 1, wherein the lapping is stopped when a predetermined time elapses from a time when the electric resistance exceeds a predetermined value or the electric resistance exceeds a predetermined value.

3. The method of claim 2, wherein the microwave oscillator is formed in a direction parallel to the height direction of the main pole.

4. The method of claim 2, wherein the microwave oscillator is formed in a direction inclined to the height direction of the main pole.

5. The method of claim 3, wherein the main pole comprises a side surface inclined to the height direction of the main pole, and the side shield comprises a side surface inclined to oppose the side surface of the main pole via the side gap, and
    the microwave oscillator is formed to cross the side gap and also to cover the main pole and the side shield.

6. The method of claim 5, wherein the microwave oscillator is formed to be displaced to an end side of the main pole in the width direction with respect to a central axis of the main pole.

7. The method of claim 4, wherein the main pole comprises a side surface inclined to the height direction of the main pole, and the side shield comprises a side surface inclined to oppose the side surface of the main pole via the side gap, and
    the microwave oscillator is formed to cross the side gap and also to cover the main pole and the side shield.

8. The method of claim 7, wherein the microwave oscillator is formed to be displaced to an end side of the main pole in the width direction with respect to a central axis of the main pole.

9. The method of claim 1, wherein the microwave oscillator is formed in a direction parallel to the height direction of the main pole.

10. The method of claim 1, wherein the microwave oscillator is formed in a direction inclined to the height direction of the main pole.

11. The method of claim 1, wherein the main pole comprises a side surface inclined to the height direction of the main pole, and the side shield comprises a side surface inclined to oppose the side surface of the main pole via the side gap, and
    the microwave oscillator is formed to cross the side gap and also to cover the main pole and the side shield.

12. The method of claim 1, wherein the microwave oscillator is formed to be displaced to an end side of the main pole in the width direction with respect to a central axis of the main pole.

13. A method of manufacturing a magnetic recording head which comprises a main pole configured to apply a recording magnetic field, a write shield opposing the main pole with a write gap between the main pole and the write shield, a side shield disposed on a lateral side of the main pole in a width direction thereof with a side gap between the main pole and the side shield, and a microwave oscillator provided between the main pole and the write shield within the write gap, the method comprising:
    forming the main pole and the side shield;
    forming the microwave oscillator to cover the main pole and the side shield and also to cross at least a part of the side gap;
    forming a main pole pattern, a side shield pattern and a microwave oscillator pattern for monitoring simultaneously with the main pole, the side shield and the microwave oscillator, respectively; and
    lapping the main pole, the side shield and the microwave oscillator in a height direction while monitoring an electric resistance between the main pole pattern and the side shield pattern.

14. The method of claim 13, wherein the lapping is stopped when a predetermined time elapses from a time when the electric resistance exceeds a predetermined value or the electric resistance exceeds a predetermined value.

15. The method of claim 14, wherein the microwave oscillator is formed in a direction parallel to the height direction of the main pole.

16. The method of claim 14, wherein the microwave oscillator is formed in a direction inclined to the height direction of the main pole.

17. The method of claim 15, wherein the main pole comprises a side surface inclined to the height direction of the main pole, and the side shield comprises a side surface inclined to oppose the side surface of the main pole via the side gap, and the microwave oscillator is formed to cross the side gap and also to cover the main pole and the side shield.

18. The method of claim 17, wherein the microwave oscillator is formed to be displaced to an end side of the main pole in the width direction with respect to a central axis of the main pole.

\* \* \* \* \*